(12) United States Patent
Cernik

(10) Patent No.: US 7,231,674 B1
(45) Date of Patent: Jun. 19, 2007

(54) TOILET MOVING CART SYSTEM

(76) Inventor: David A. Cernik, 1163 8th Ave. West, West Fargo, ND (US) 58078

( * ) Notice: Subject to any disclaimer, the term of this patent is extended or adjusted under 35 U.S.C. 154(b) by 376 days.

(21) Appl. No.: 11/041,472

(22) Filed: Jan. 24, 2005

(51) Int. Cl.
*A47K 17/00* (2006.01)

(52) U.S. Cl. ........................................ 4/661; 280/47.17

(58) Field of Classification Search .................... 4/661; 280/47.17, 47.34; 269/15; 220/DIG. 15
See application file for complete search history.

(56) References Cited

U.S. PATENT DOCUMENTS

| | | | | |
|---|---|---|---|---|
| 2,896,877 A | * | 7/1959 | Vaughn | 242/557 |
| 3,391,905 A | | 7/1968 | Burns | 254/7 |
| 3,937,414 A | * | 2/1976 | Bank et al. | 242/557 |
| 4,722,511 A | | 2/1988 | Chitwood | 254/7 |
| 5,074,572 A | * | 12/1991 | Delmerico et al. | 280/47.34 |
| 5,184,653 A | | 2/1993 | Lacy | 141/98 |
| 5,203,065 A | | 4/1993 | Peters | 29/281.4 |
| 5,373,593 A | | 12/1994 | Decky et al. | 4/661 |
| 5,505,430 A | | 4/1996 | Barnett | 254/2 |
| 5,556,076 A | | 9/1996 | Jacquay | 254/8 |
| 5,716,183 A | | 2/1998 | Gibson et al. | 414/451 |
| 6,015,137 A | | 1/2000 | Guervara et al. | 254/323 |
| 6,135,466 A | | 10/2000 | Irwin | 280/47.28 |
| 6,685,170 B1 | | 2/2004 | Gwynn | 254/325 |
| 7,114,732 B1 | * | 10/2006 | Ismail | 280/47.34 |

* cited by examiner

*Primary Examiner*—Charles E. Phillips

(57) ABSTRACT

A toilet moving cart system for efficiently moving a toilet. The toilet moving cart system includes a base for receiving a conventional toilet, a stub member within the base, a plurality of wheels attached to the base, and a handle attached to the base. The stub member extends upwardly into the lower opening within the toilet when the toilet is positioned upon the base. A cap is removably attached to the base for sealing the fill valve within the toilet during transportation to prevent water leakage.

16 Claims, 10 Drawing Sheets

TOILET MOVING CART SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to toilets and more specifically it relates to a toilet moving cart system for efficiently moving a toilet.

2. Description of the Related Art

Any discussion of the prior art throughout the specification should in no way be considered as an admission that such prior art is widely known or forms part of common general knowledge in the field.

Toilets have been in use for years. As shown in FIG. 2 of the drawings, a conventional toilet (12) is typically comprised of a water tank (14), and a bowl (16) having a base and a lower opening fluidly connected to a siphon channel. A fill valve (18) is positioned within water tank to allow the tank to fill to a predetermined height. The lower opening in the base of the bowl is sealed with a wax seal to a sewage pipe in the building structure.

When moving an existing toilet from a building structure, there can be a volume of water remaining in the bowl and the water tank which can escape through the lower opening when the toilet is moved. Also, conventional toilets are relatively heavy and cumbersome to manually move.

While these devices may be suitable for the particular purpose to which they address, they are not as suitable for efficiently moving a toilet. Conventional methods of moving toilets into and out of a building mainly involve physically lifting and moving the toilet.

In these respects, the toilet moving cart system according to the present invention substantially departs from the conventional concepts and designs of the prior art, and in so doing provides an apparatus primarily developed for the purpose of efficiently moving a toilet.

BRIEF SUMMARY OF THE INVENTION

The present invention generally comprises a base for receiving a conventional toilet, a stub member within the base, a plurality of wheels attached to the base, and a handle attached to the base. The stub member extends upwardly into the lower opening within the toilet when the toilet is positioned upon the base. A cap is removably attached to the base for sealing the fill valve within the toilet during transportation to prevent water leakage.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a toilet moving cart system that will overcome the shortcomings of the prior art devices.

A second object is to provide a toilet moving cart system for efficiently moving a toilet.

Another object is to provide a toilet moving cart system that reduces the amount of physical labor required to move a conventional toilet and thereby possibly reducing physical injuries to workers employed to move toilets.

An additional object is to provide a toilet moving cart system that prevents water spillage during moving of a toilet.

A further object is to provide a toilet moving cart system that prevents wax from contaminating a floor of a building structure.

Another object is to provide a toilet moving cart system that allows a user to move a toilet up or down steps without spilling water or contaminating the steps with wax.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
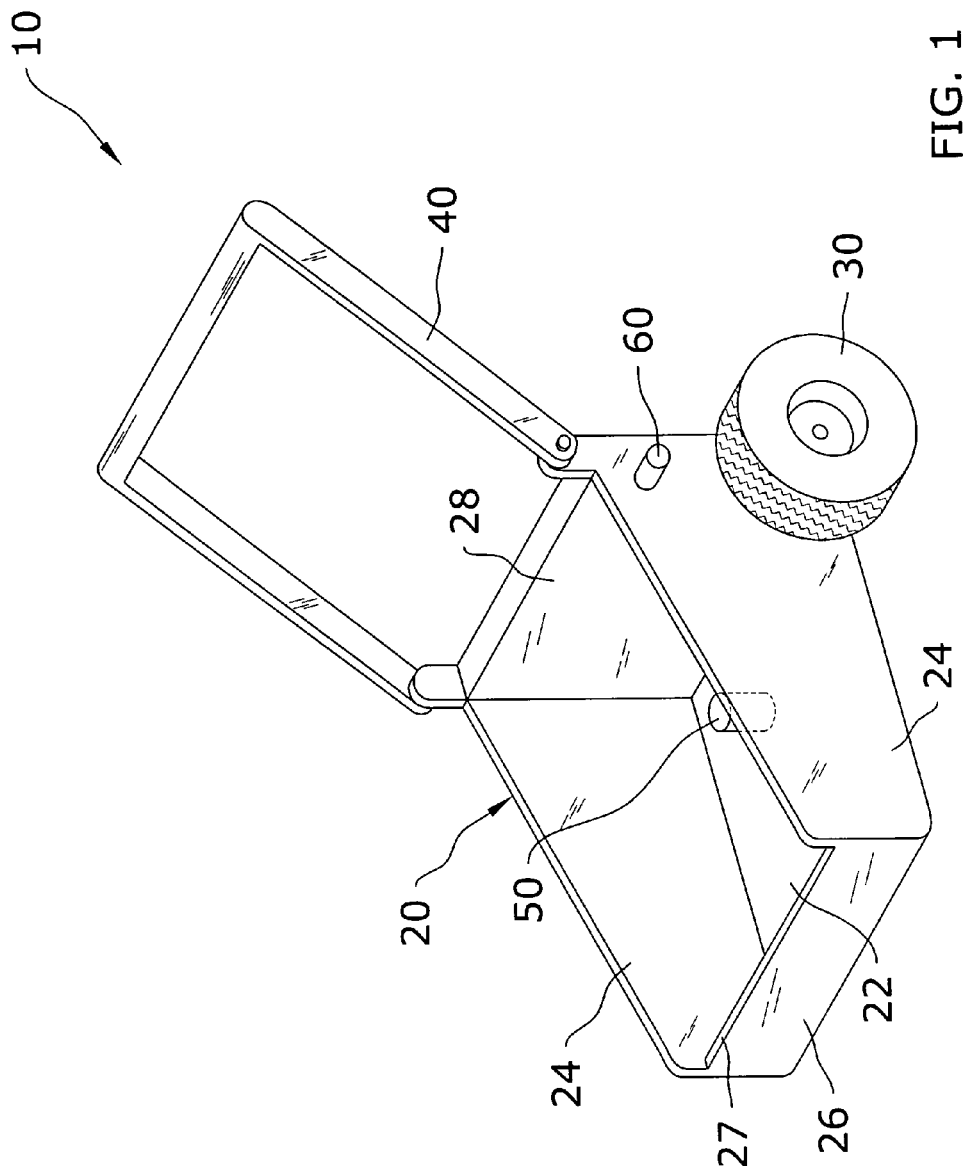
FIG. 1 is an upper perspective view of the present invention.

Turning now descriptively to the drawings, in which similar reference characters denote similar elements throughout the several views, FIGS. 1 through 10 illustrate a toilet moving cart system 10, which comprises a base 20 for receiving a conventional toilet 12, a stub member 50 within the base 20, a plurality of wheels 30 attached to the base 20, and a handle 40 attached to the base 20. The stub member 50 extends upwardly into the lower opening within the toilet 12 when the toilet 12 is positioned upon the base 20. A cap 60 is removably attached to the base 20 for sealing the fill valve 18 within the toilet 12 during transportation to prevent water leakage.

B. Base

FIGS. 1 through 10 illustrate a preferred embodiment of the base 20 formed for removably receiving and supporting a toilet 12. It can be appreciated that other base 20 structures and combinations of the present structure may be utilized to construct the base 20.

Figure 5:
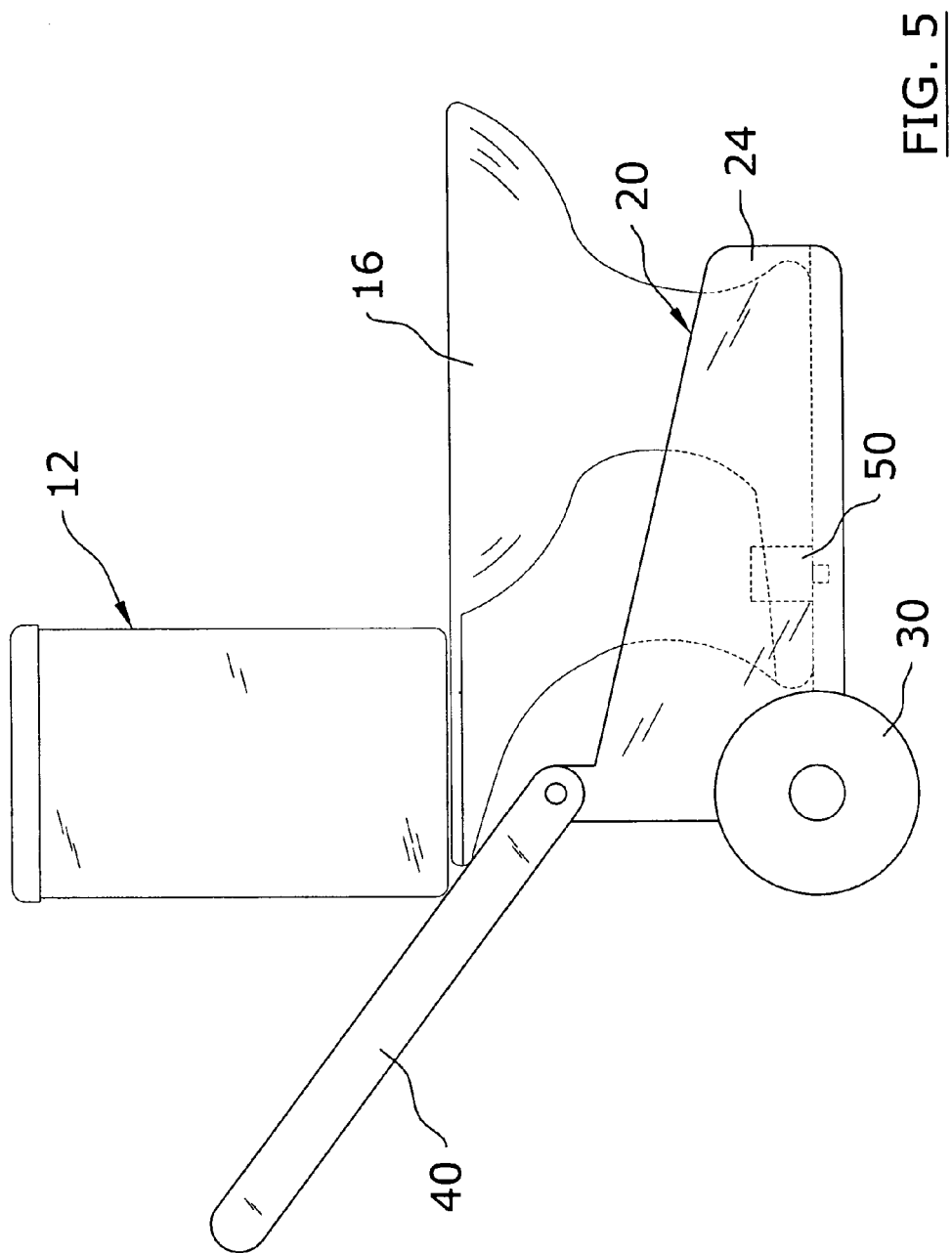
FIG. 5 is a side view of the present invention with a toilet positioned within the base.
Figure 6:
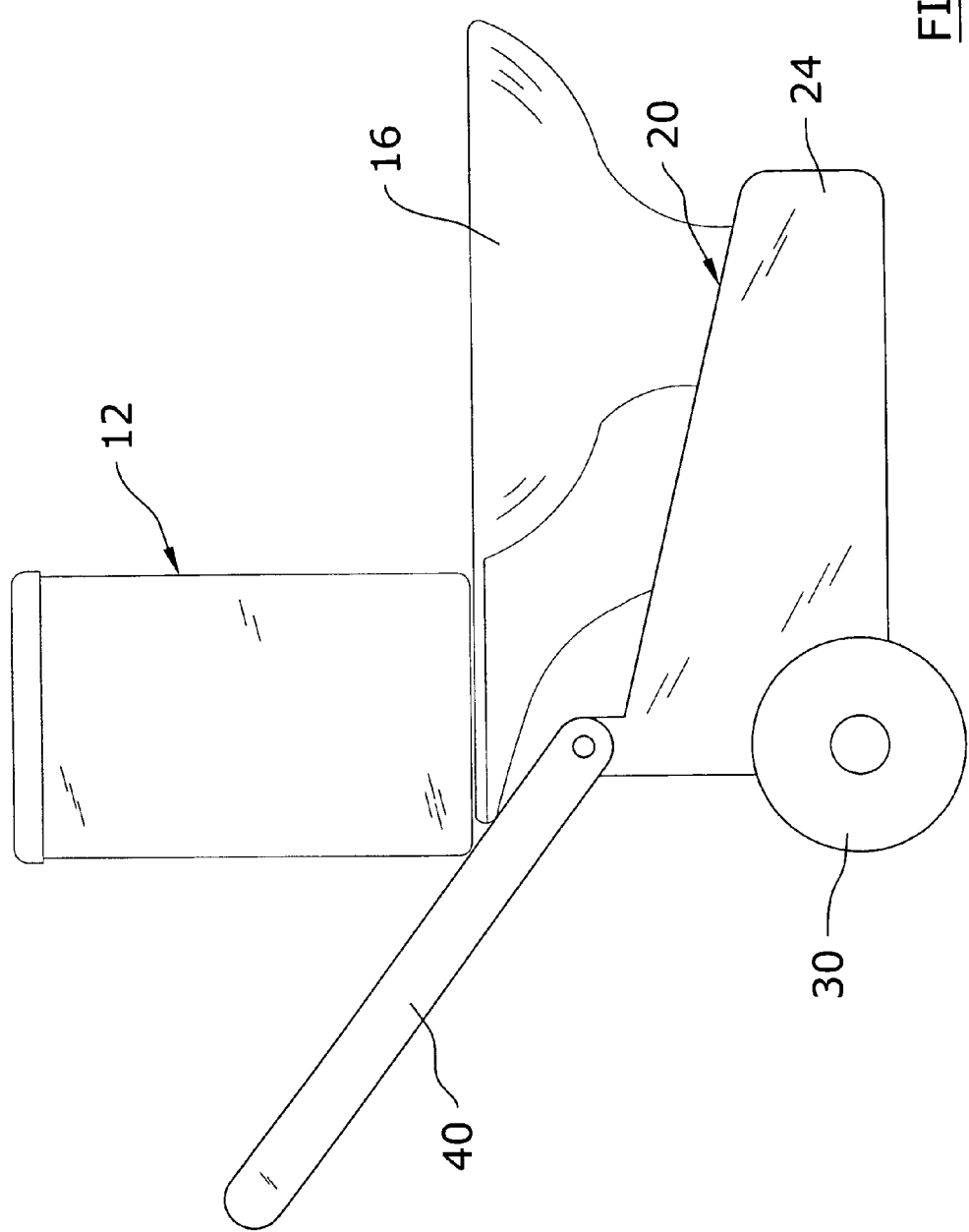
FIG. 6 is a side view of the present invention with a toilet positioned within the base.
Figure 7:
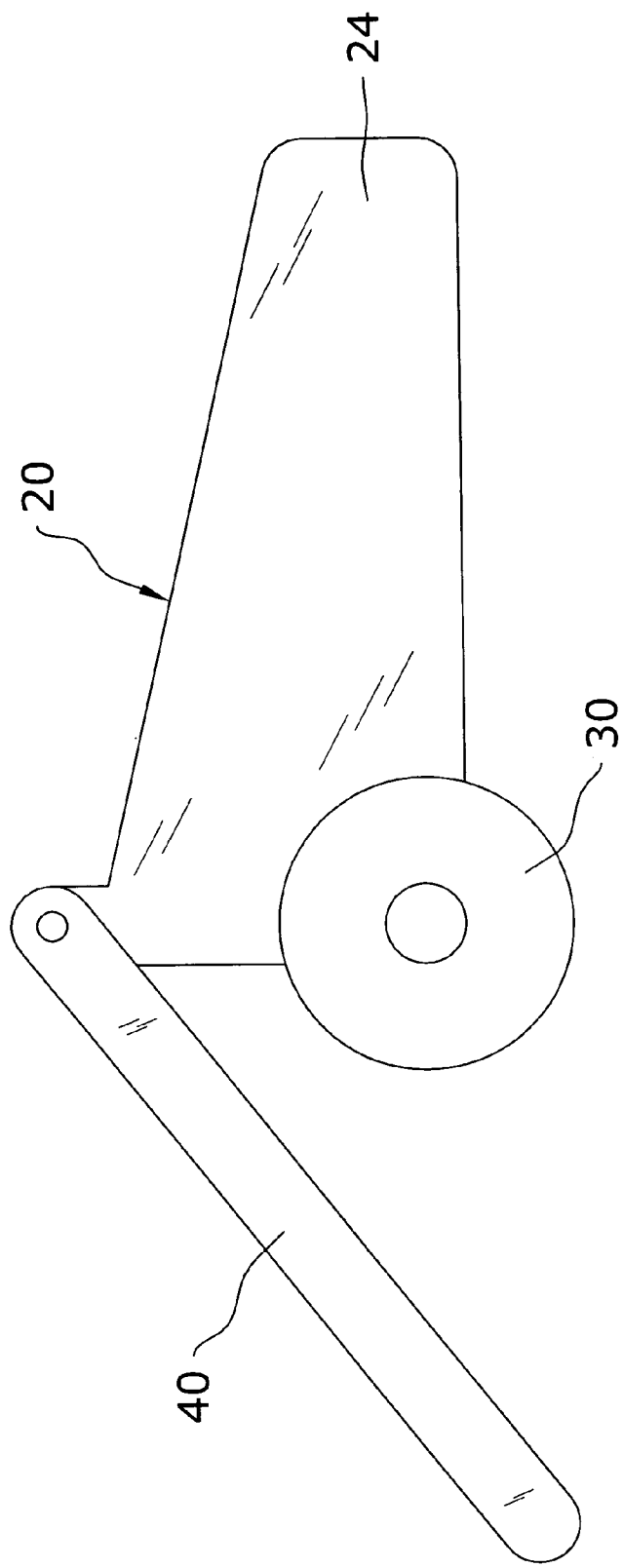
FIG. 7 is a side view of the present invention with the handle lowered.

As best illustrated in FIG. 1 of the drawings, the base 20 is preferably comprised of a platform 22, a pair of opposing sidewalls 24 extending from opposing sides of the platform 22 defining a front opening 27, a rear wall 28 extending from a rear portion of the platform 22, and a front wall 26 extending from a front portion of the platform 22 defining an interior cavity sufficient in size to receive the bowl 16 of the toilet 12. The rear wall 28 is formed to prevent interference with the water tank 14 of the toilet 12 as shown in FIGS. 5 and 6 of the drawings.

The front wall 26 is preferably lower than the rear wall 28 to assist in positioning of the toilet 12 into and out of the base 20. The sidewalls 24 preferably taper from the rear wall 28 to the front wall 26 as shown in FIGS. 3 through 7 of the drawings. The front wall 26 is preferably lower than an adjacent end of the sidewalls 24 as best illustrated in FIG. 1 of the drawings.

A plurality of wheels 30 are attached to the base 20 for allowing the base 20 with a toilet 12 positioned within to be easily moved from one location to another. The plurality of wheels 30 are preferably positioned within a rear portion of the base 20 as shown in FIGS. 1 through 7 of the drawings. It is preferable to have two wheels 30 in the rear portion of the base 20 thereby allowing the user to simply tilt the base 20 rearwardly to move the base 20 and to lower front of the base 20 to stop movement of the base 20.

Figure 8:
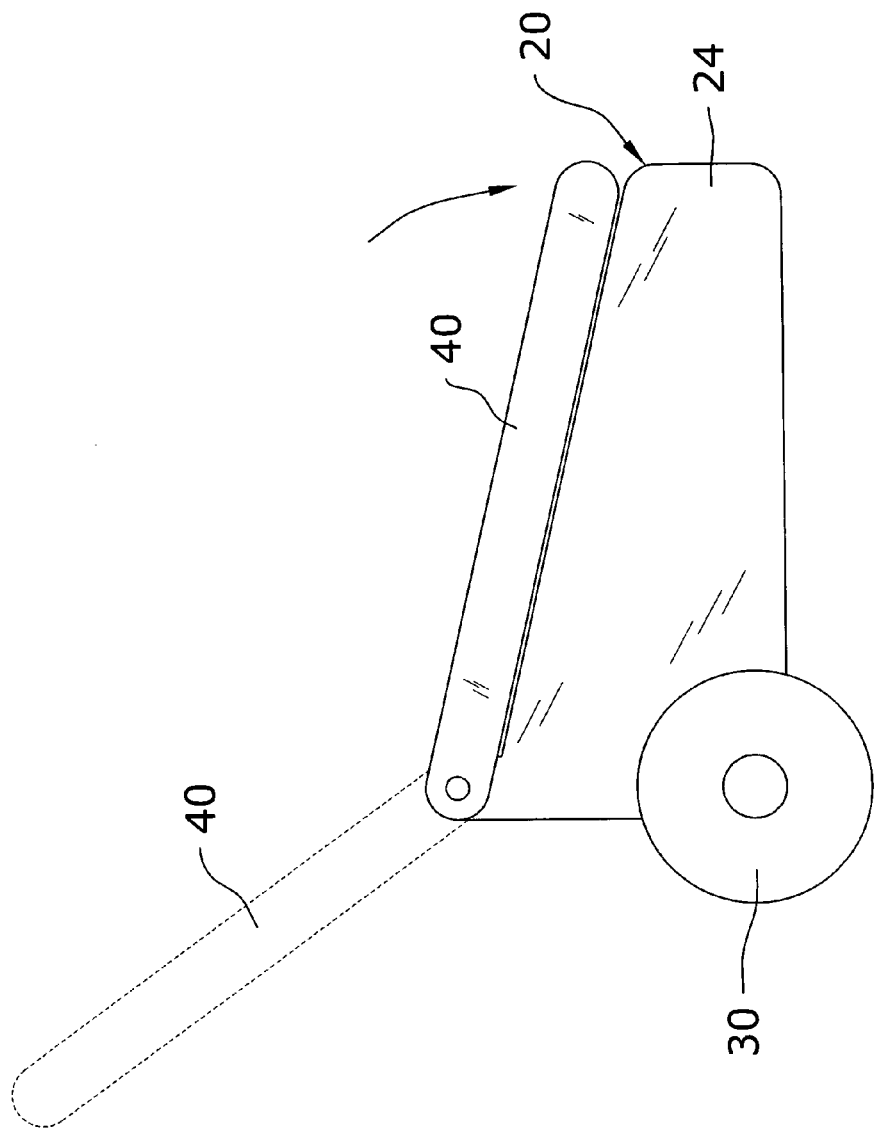
FIG. 8 is a side view of the present invention with the handle in the storage position.
Figure 9:
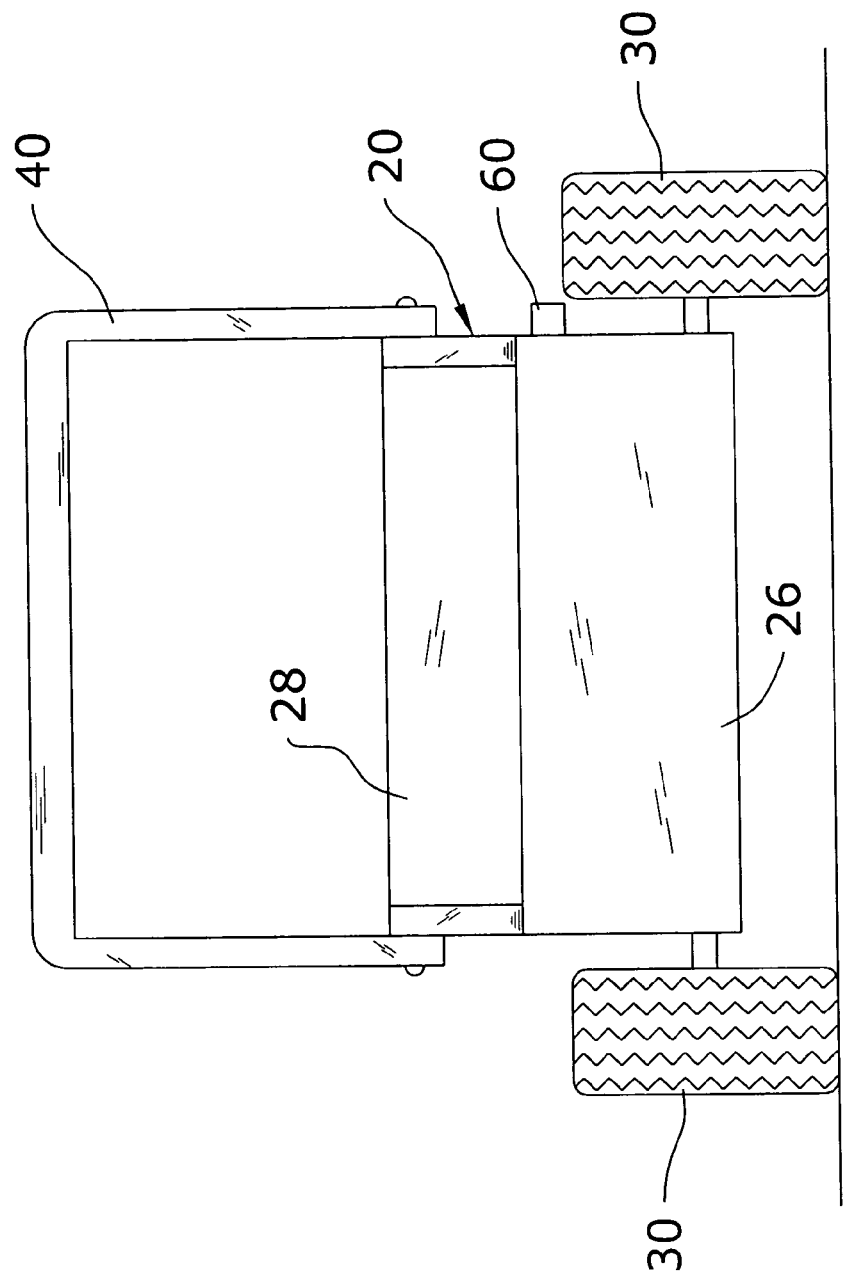
FIG. 9 is a front view of the present invention.
Figure 10:
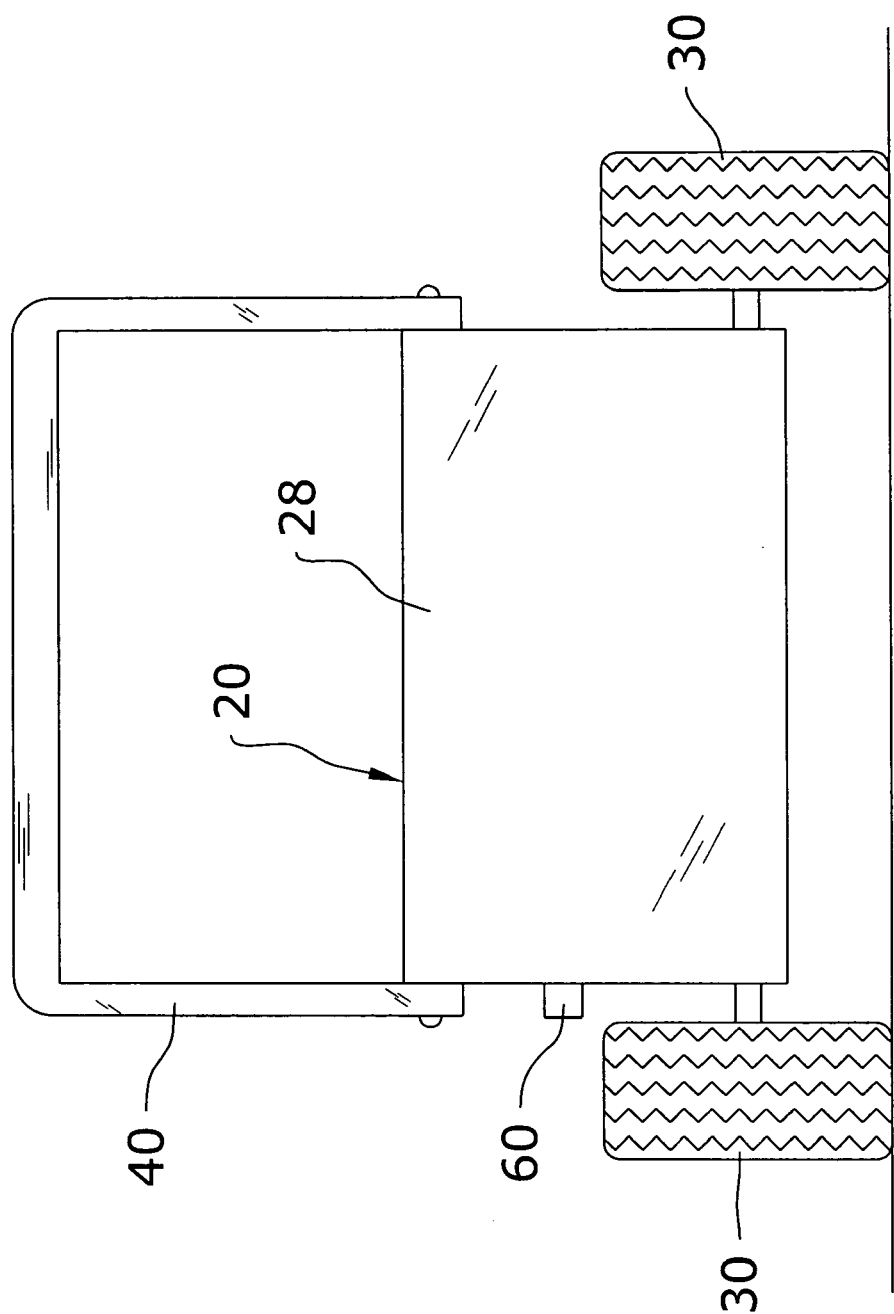
FIG. 10 is a rear view of the present invention.

A handle 40 is preferably attached to the base 20 as shown in FIGS. 1 through 10 of the drawings. The handle 40 is preferably pivotally attached to the base 20 to allow for positioning into a storage position as shown in FIG. 8 of the drawings. The handle 40 preferably has a U-shaped structure as best illustrated in FIGS. 9 and 10 of the drawings, however the handle 40 may have different shapes.

C. Stub Member

Figure 4:
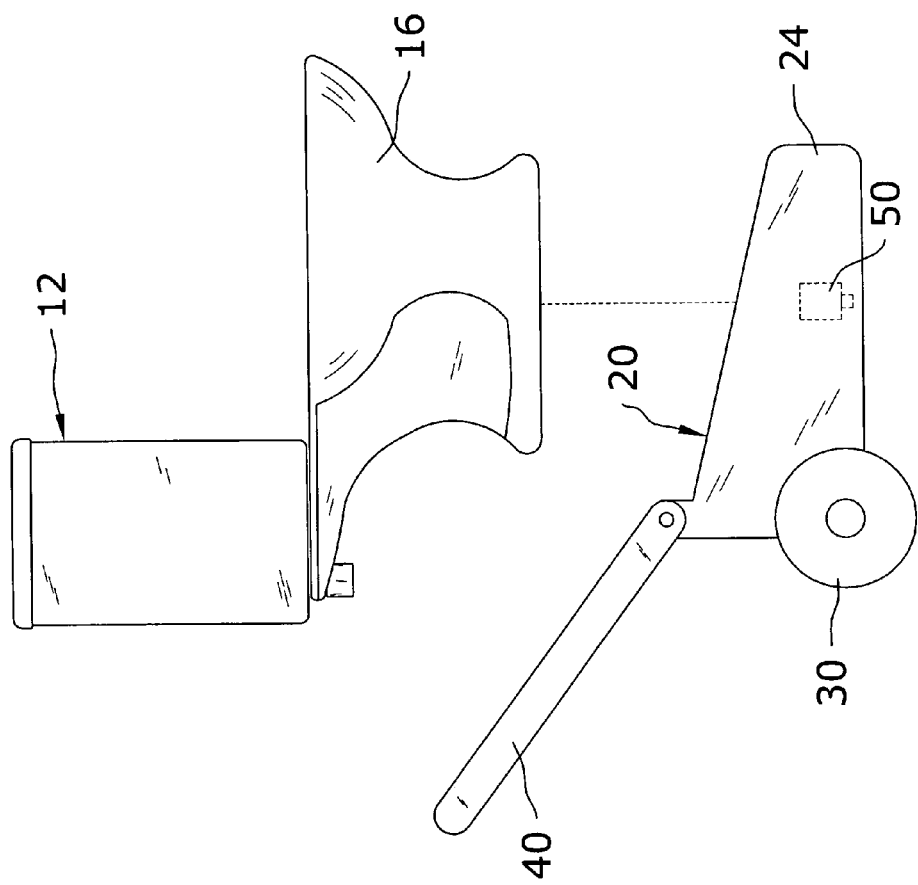
FIG. 4 is an exploded side view of the present invention and a toilet.

A stub member 50 preferably extends upwardly from within the base 20 as shown in FIGS. 1 and 4 of the drawings. The stub member 50 extends upwardly into a lower opening within the toilet 12 when the toilet 12 is positioned upon the base 20 as shown in FIG. 5 of the drawings. The stub member 50 is preferably removably attachable to the base 20 using a conventional removable attachment method such as using an extended tongue and aperture structure.

D. Cap

Figure 2:
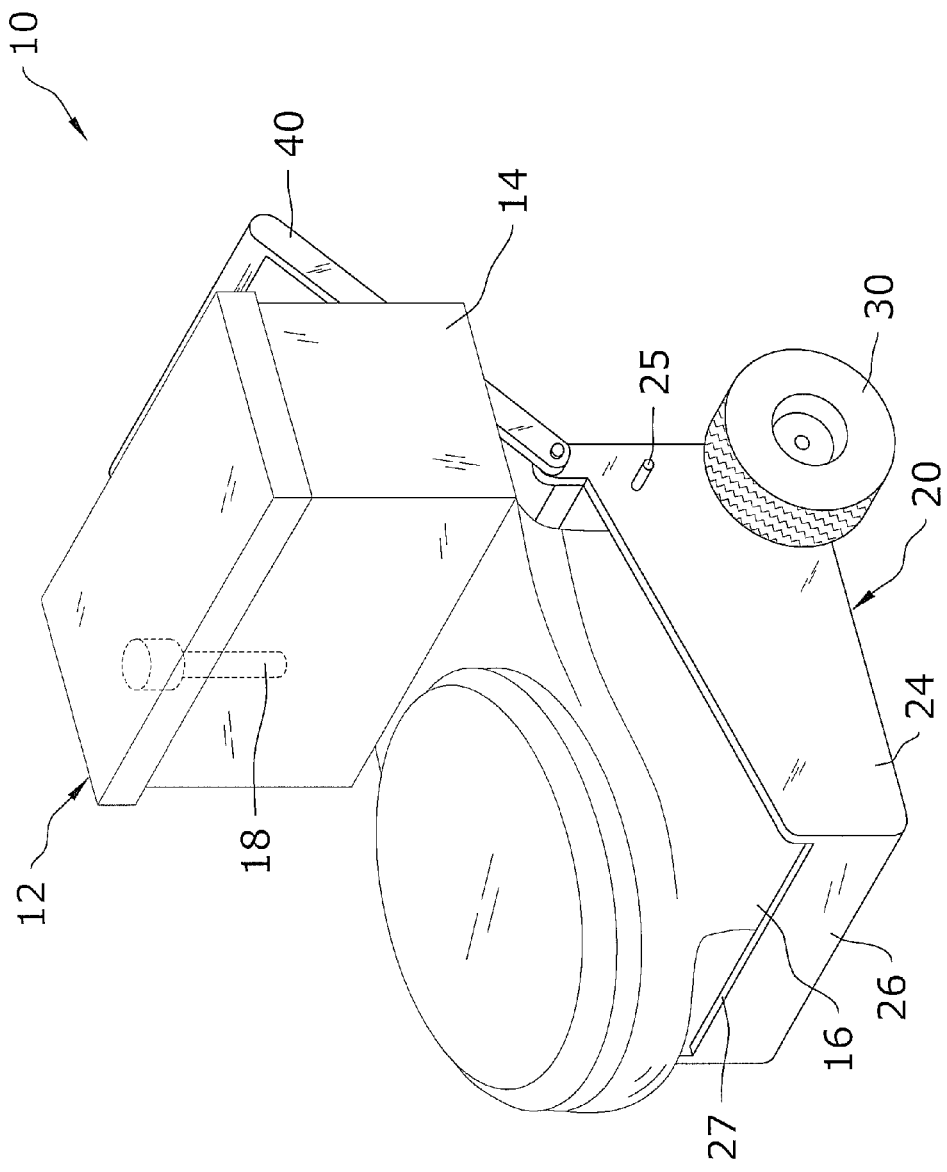
FIG. 2 is an upper perspective view of the present invention with a toilet positioned thereupon.
Figure 3:
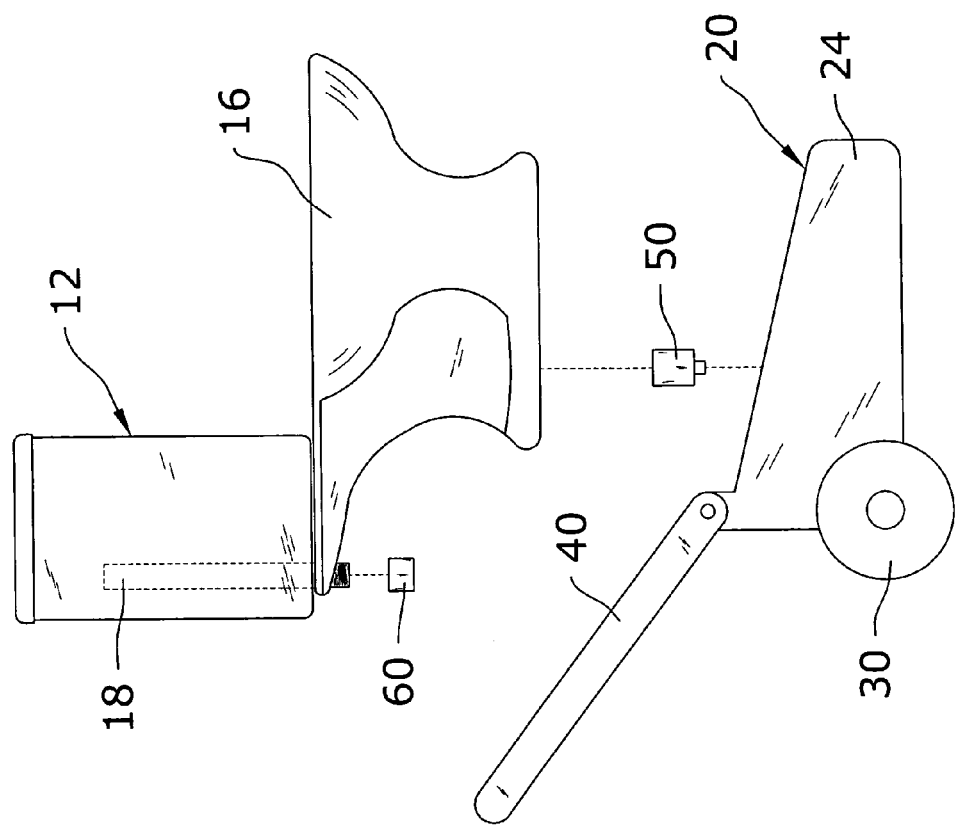
FIG. 3 is an exploded side view of the present invention with respect to a toilet.

A support post 25 preferably extends substantially horizontally from the base 20 as shown in FIG. 2 of the drawings. A cap 60 is preferably removably attached to the support post 25, wherein the cap 60 is formed for sealing a lower end of a fill valve 18 within the toilet 12 during transportation to prevent water leakage. The cap 60 may be stored in various other locations upon the present invention including the handle 40.

E. Operation of Invention

In use, the user positions the base 20 in front of a toilet 12 to be moved with the front end of the base 20 adjacent to the front of the toilet 12. The user then lifts the toilet 12 (after removing all fasteners) and positions the toilet 12 within the interior of the base 20 such that the stub member 50 extends into the lower opening of the bowl 16 of the toilet 12. The stub member 50 assists in preventing movement of the toilet 12 and if formed in such a manner may also prevent leakage of water from the basin of the bowl 16. The user then rolls the present invention with the toilet 12 positioned within using the handle 40. Once the toilet 12 is near the desired location, the user removes the toilet 12 from the base 20 and positions the same in the desired location. The user then removes the cap 60 from the fill valve 18.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

Index of Elements for Toilet Moving Cart System (CERN-001)

| | |
|---|---|
| ☐ | ☐ 40. Handle |
| ☐ | ☐ 41. |
| ☐ | ☐ 42. |
| ☐ | ☐ 43. |
| ☐ | ☐ 44. |
| ☐ | ☐ 45. |
| ☐ | ☐ 46. |
| ☐ | ☐ 47. |
| ☐ | ☐ 48. |
| ☐ | ☐ 49. |
| ☐ 10. Toilet Moving Cart System | ☐ 50. Stub Member |
| ☐ 11. | ☐ 51. |
| ☐ 12. Toilet | ☐ 52. |
| ☐ 13. | ☐ 53. |
| ☐ 14. Water Tank | ☐ 54. |
| ☐ 15. | ☐ 55. |
| ☐ 16. Bowl | ☐ 56. |
| ☐ 17. | ☐ 57. |
| ☐ 18. Fill Valve | ☐ 58. |
| ☐ 19. | ☐ 59. |
| ☐ 20. Base | ☐ 60. Cap |
| ☐ 21. | ☐ 61. |
| ☐ 22. Platform | ☐ 62. |
| ☐ 23. | ☐ 63. |
| ☐ 24. Sidewalls | ☐ 64. |
| ☐ 25. Support Post | ☐ 65. |
| ☐ 26. Front Wall | ☐ 66. |
| ☐ 27. Front Opening | ☐ 67. |
| ☐ 28. Rear Wall | ☐ 68. |
| ☐ 29. | ☐ 69. |
| ☐ 30. Wheels | ☐ 70. |
| ☐ 31. | ☐ 71. |

-continued

| Index of Elements for Toilet Moving Cart System (CERN-001) | |
|---|---|
| ☐ 32. | ☐ 72. |
| ☐ 33. | ☐ 73. |
| ☐ 34. | ☐ 74. |
| ☐ 35. | ☐ 75. |
| ☐ 36. | ☐ 76. |
| ☐ 37. | ☐ 77. |
| ☐ 38. | ☐ 78. |
| ☐ 39. | ☐ 79. |

I claim:

1. A toilet moving cart system, comprising: a base for removably receiving and supporting a toilet; a stub member extending upwardly within said base, wherein said stub member extends upwardly into a lower opening within the toilet when the toilet is positioned upon said base; a plurality of wheels attached to said base; a handle attached to said base, said system further including a cap removably attached to said base for sealing a lower end of a fill valve of the toilet during transportation to prevent water leakage therefrom and a support post extending substantially horizontally from said base for removably supporting said cap.

2. The toilet moving cart system of claim 1, wherein said handle is pivotally attached to said base.

3. The toilet moving cart system of claim 1, wherein said stub member is removably attachable to said base.

4. The toilet moving cart system of claim 1, wherein said base is comprised of:
a platform;
a pair of opposing sidewalls extending from opposing sides of said platform defining a front opening; and
a rear wall extending from a rear portion of said platform.

5. The toilet moving cart system of claim 4, including a front wall extending from a front portion of said platform.

6. The toilet moving cart system of claim 5, wherein said front wall is lower than said rear wall.

7. The toilet moving cart system of claim 5, wherein said sidewalls taper from said rear wall to said front wall.

8. The toilet moving cart system of claim 7, wherein said front wall is lower than an adjacent end of said sidewalls.

9. A toilet moving cart system, comprising:
a base for removably receiving and supporting a toilet;
a stub member extending upwardly within said base, wherein said stub member extends upwardly into a lower opening within the toilet when the toilet is positioned upon said base;
a plurality of wheels attached to said base;
a handle attached to said base, wherein said handle is pivotally attached to said base and wherein said handle has a U-shaped structure;
a support post extending substantially horizontally from said base; and
a cap removably attached to said support post, wherein said cap is formed for sealing a lower end of a toilet tank fill valve during transportation to prevent water leakage therefrom.

10. The toilet moving cart system of claim 9, wherein said stub member is removably attachable to said base.

11. The toilet moving cart system of claim 9, wherein said base is comprised of:
a platform;
a pair of opposing sidewalls extending from opposing sides of said platform defining a front opening; and
a rear wall extending from a rear portion of said platform.

12. The toilet moving cart system of claim 11, including a front wall extending from a front portion of said platform.

13. The toilet moving cart system of claim 12, wherein said front wall is lower than said rear wall.

14. The toilet moving cart system of claim 12, wherein said sidewalls taper from said rear wall to said front wall.

15. The toilet moving cart system of claim 14, wherein said front wall is lower than an adjacent end of said sidewalls.

16. A toilet moving cart system, comprising:
a base for removably receiving and supporting a toilet, wherein said base is comprised of:
a platform;
a pair of opposing sidewalls extending from opposing sides of said platform defining a front opening;
a rear wall extending from a rear portion of said platform;
a front wall extending from a front portion of said platform, wherein said front wall is lower than said rear wall, wherein said sidewalls taper from said rear wall to said front wall and wherein said front wall is lower than an adjacent end of said sidewalls;
a stub member extending upwardly within said base, wherein said stub member extends upwardly into a lower opening within the toilet when the toilet is positioned upon said base, and wherein said stub member is removably attachable to said base;
a plurality of wheels attached to said base;
a handle attached to said base, wherein said handle is pivotally attached to said base and wherein said handle has a U-shaped structure;
a support post extending substantially horizontally from said base; and
a cap removably attached to said support post, wherein said cap is formed for sealing a lower end of a toilet tank fill valve during transportation to prevent water leakage therefrom.

\* \* \* \* \*